(No Model.)
H. F. FULLER.
ACETYLENE GAS GENERATOR.
No. 566,901.          Patented Sept. 1, 1896.
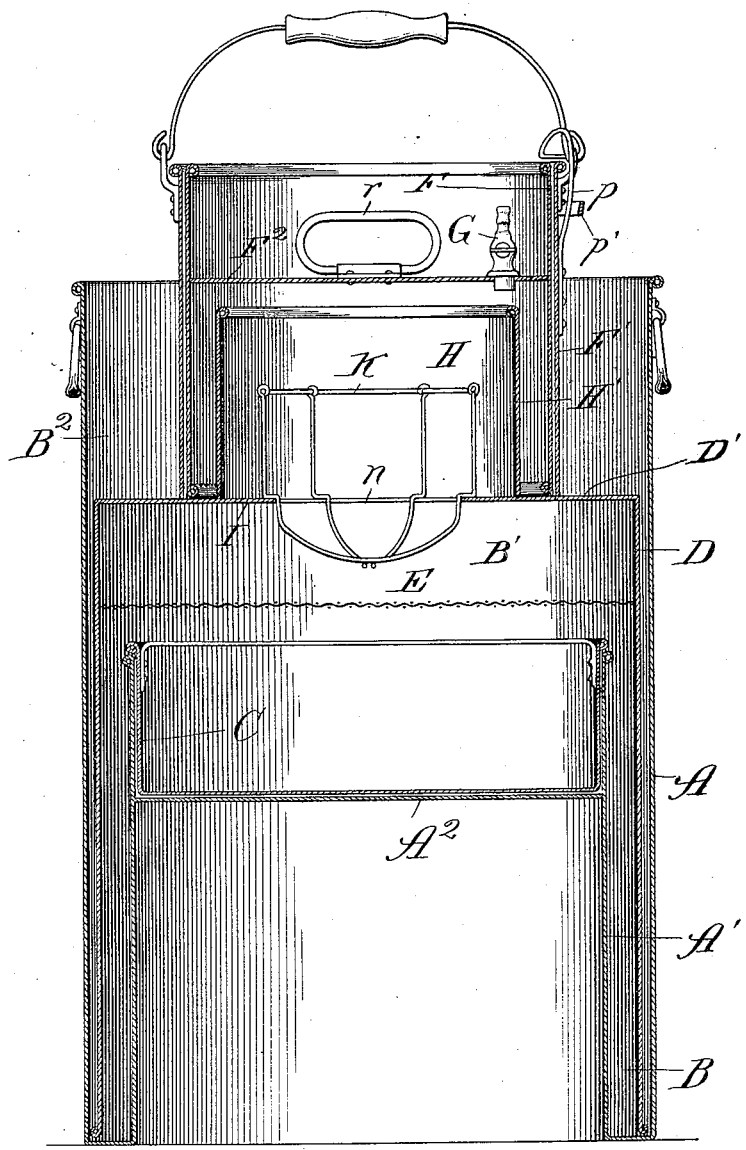
Witnesses:
Inventor:
Henry F. Fuller.
By Dyrenforth & Dyrenforth,
Att'ys

UNITED STATES PATENT OFFICE.

HENRY F. FULLER, OF CHICAGO, ILLINOIS, ASSIGNOR TO THE WALMSLEY, FULLER & COMPANY, OF SAME PLACE.

ACETYLENE-GAS GENERATOR.

SPECIFICATION forming part of Letters Patent No. 566,901, dated September 1, 1896.

Application filed May 5, 1896. Serial No. 590,297. (No model.)

*To all whom it may concern:*

Be it known that I, HENRY F. FULLER, a citizen of the United States, residing at Chicago, in the county of Cook and State of Illinois, have invented a new and useful Improvement in Gas-Generators, of which the following is a specification.

My invention relates to an improved construction of apparatus for generating gas by the chemical action of a liquid upon a solid material, such as water upon calcium carbid, which produces acetylene gas. In fact, I have especially devised my improvement for generating acetylene gas by the action of water upon calcium carbid, though I do not desire to limit my invention to the use therewith of these particular materials, but intend to protect it for its purpose of generating gas by bringing together any liquid and solid material having a gas-generating affinity for each other. For the sake of convenience, however, I confine the description of my improvement, hereinafter contained, to its use in the manufacture of acetylene gas from calcium carbid and water.

More particularly stated, my improvement relates to the gasometer variety of gas-generators, especially of the portable kind, the action of which is to store the generated gas and cause it to exert a pressure upon the liquid element sufficient to separate and maintain separated therefrom the solid element, and thus discontinue the gas generation when or during the time that a desired predetermined degree of pressure of the gas is contained in the holder.

One of the more important objects of my invention is to improve the construction of the holder for the solid material (calcium carbid) and thereby prolong, with a given quantity of the solid material, including a reserve supply thereof, the gas-generating action by subjecting it progressively to the effect of the liquid in contradistinction to subjecting thereto the entire, or practically the entire, bulk of the solid material at once, meantime utilizing the reserve supply of the calcium carbid for a drier.

Another such object is to provide the supply of calcium carbid in separated quantities in a manner to avoid so compacting the mass, by the swelling effect upon it of the water, as to choke off the passage through it of the evolved gas.

Another such object is to afford to the gas-holding member of the gasometer-generator, having an elongated course for travel in a comparatively small water-holding space, thereby to reduce the weight of the portable apparatus to the minimum, by reducing thereto the quantity of water required to reach to the level of the supply of calcium carbid, an expanded area of displacement to the water to prevent its overflowing the apparatus when its bulk is increased, as by the deposit in it from the solid material in excess of the consumption of the water by its gas-generating action on the calcium carbid. An exceedingly important result of this construction, affording the displacement referred to, is to adapt the apparatus to maintain a uniform predetermined pressure, at the point or points of consumption, of the generated gas, notwithstanding variation in the flotation of the movable tank due to the deposit from the solid material resulting from its consumption.

The accompanying drawing shows my improved gas-generator by a view in sectional elevation.

A is a tank formed by preference of sheet metal in cylindrical shape and turned in to a desired extent, say to about one-third of its length, accordingly to reduce its holding capacity throughout about one-half of its length to the area of the annular chamber B, formed by the turned-in or interior section A', in which, above its transverse center, is provided the bottom $A^2$ of the tank, affording, with the portion of the section A' which extends above it, a seat for a pan C to receive refuse sediment (lime) from the calcium carbid.

D is the inverted tank, also formed by preference of sheet metal and fitting the tank A in the annular chamber B, being longer than the section A', to afford a chamber B', into which the chamber B expands, and which is covered by a perforated seat or diaphragm E, or grating, below the annular top D' of the tank D, from which top there rises a shell F', open at its outer end and formed, preferably, of sheet metal and in cylindrical shape to receive the gas-holder F, which fits snugly within the shell, resting on the top D', and is provided, by preference some distance below its upper edge, as shown, with a cover F², equipped with a handle r, and with a valve-controlled outlet G, opening at its base through the cover F² into the gas-chamber below it. For retaining the holder F against its seat on the top D', I show a spring-stop p fastened to the outside of the shell F' to extend at its free-headed end normally over the upper edge of the holder, and the extent of withdrawal of which in an outward direction to free the holder and permit the latter to be taken out of the shell F', when desired, is limited by a strap p'.

H is a chamber for the supplemental or reserve supply of calcium carbid. It comprises a tubular shell H', rising from the top D' inside the shell F' about the opening n in the cover, the circumferential portion of which, between the opening and shell H', forms the base of the chamber H and a shelf I for calcium carbid extending over the diaphragm E.

In the opening n I may seat an open basket K, as shown, for containing calcium carbid.

The space between the shell H' and holder F should contain a supply of water to act as a seal to the gas in the holder.

To employ my improved apparatus for generating acetylene gas, a supply of calcium carbid is introduced through the shell F' upon the seat E in the chamber B' and tucked under the shelf I, a reserve supply of the same being imposed upon the shelf, while an additional supply may be provided in the basket K, then seated in the opening n, whereby thus three separated bodies of calcium carbid are provided, respectively, under the shelf on the diaphragm, upon the shelf, and between these two. When water is introduced into the chamber B in quantity sufficient to reach the supply of calcium carbid on the grating E, with the shell D introduced in the chamber B, as shown, and with the holder F in position in the shell F', the apparatus is in operative condition to generate the gas, which is evolved by contact of the water with the calcium carbid on the diaphragm and passes through the calcium carbid in the chamber H, whereby it is dried, and accumulates in the holder F, whence it is tapped at the outlet G for use, either for immediate burning, if the apparatus be of a size to afford a lamp, as it may be, or to be led off from the apparatus, if the latter be constructed to afford a mere generator, for consumption at remote burners. When the consumption of the evolved gas is slower than its generation, the pressure of the gas accumulation against the supply of water forces upward the tank D and parts carried by it, thereby separating the diaphragm, and consequently the calcium carbid imposed thereon, from the water, the level of which inside the tank D is thereby also forced down and raised in the space between the tanks A and D. The bulk of the water (augmented by placing into position the tank D and by the sediment deposited in it from the consumed calcium carbid) may become so great that the pressure of gas would tend to raise the water-level between the tanks A and D beyond the upper edge of the tank A if the space between the two tanks were uniform throughout. Hence I expand this space, as shown at B², above the top D' between the tank A and shell F' to increase its capacity by way of compensating for the increase in the bulk of water and thus preventing its overflow. A more important object of the expanded annular space B², however, is to compensate for the effect of consumption of the solid calcium carbid in decreasing the weight of the floating tank D. This object is accomplished in a manner to maintain a uniform pressure, at the burner or burners, of the generated gas by the lesser water displacement in the space B² of the narrower shell F' to maintain the flotation of the tank when the wider, lower portion of the tank ceases to produce pressure by reason of the effect of the water when the latter reaches to and beyond the cover D' to attack the reserve supply of the carbid.

By my improved construction of the generator the supply of calcium carbid upon the shelf I, being separated from that below the plane of the shelf, need not be attacked until the latter is consumed, thereby affording a reserve supply and prolonging the time within which the gas generation takes place by causing the attack of water on the calcium-carbid supply to be made progressively. This effect is, of course, augmented by the interposition of the additional supply of the solid material in the basket K, and, moreover, by thus providing for the separation of the supply into sections the swelling of the calcium carbid, which ensues from the moisture to which it is subjected, cannot so compact it as to prevent the passage through it of the evolved gas into the holder H.

What I claim as new, and desire to secure by Letters Patent, is—

1. In a gas-generator for evolving gas by contact of a liquid with a solid material, the combination of an outer tank, an inner tank seated in said outer tank and containing a seat for the solid material, a gas-holder rising from and opening into said inner tank and an expansion-chamber B² formed between said holder and the outer tank, substantially as described.

2. In a gas-generator for evolving gas by contact of a liquid with a solid material, the combination of the outer tank having a raised bottom forming the reduced circumferential liquid-chamber B, the inner movable tank in said chamber, a seat for the solid material in said inner tank, a gas-holder rising from and opening into said inner tank, and an expanded extension $B^2$ of said chamber B formed between said holder and the outer tank, substantially as and for the purpose set forth.

3. In a gas generator for evolving gas by contact of a liquid with a solid material, the combination of an outer tank, an inner tank movably supported in said outer tank and containing a perforated seat for the solid material, a gas-holder surmounting and opening into said inner tank, and a shelf at the opening between said holder and inner tank and projecting over said perforated seat, substantially as and for the purpose set forth.

4. In a gas-generator for evolving gas by contact of a liquid with a solid material, the combination of an outer tank, an inner tank movably supported in said outer tank and containing a perforated seat for the solid material, a gas-holder surmounting and opening into said inner tank, a shelf at the opening between said holder and inner tank and projecting over said perforated seat, and a basket for said solid material removably seated in said opening, substantially as and for the purpose set forth.

5. In a gas-generator for evolving gas by contact of a liquid with a solid material, the combination of an outer tank, an inner tank movably supported in said outer tank and containing a grating E, and provided with a cover $D'$ having an opening $n$, a shell $F'$ rising from said cover, a portion of said cover affording a shelf I projecting over said grating about said opening, and a gas-holder F removably fitting the shell $F'$ and provided with a cover $F^2$ and an outlet, substantially as and for the purpose set for.

6. In a gas-generator for evolving gas by contact of a liquid with a solid material, the combination of an outer tank, an inner tank movably supported in said outer tank and containing a grating E and provided with a cover $D'$ having an opening $n$, a shell $F'$ rising from said cover and a shell $H'$ rising therefrom inside the shell $F'$ and forming the chamber H with a portion of said cover affording at its base a shelf I, projecting over said grating about said opening, and a gas-holder F removably fitting the shell $F'$ and provided with an outlet, substantially as and for the purpose set forth.

7. A gas-generator for evolving gas by contact of a liquid with a solid material, comprising, in combination, the tank A having the raised bottom $A^2$ affording a support for a pan C and forming the liquid-chamber B, the tank D in said chamber provided with a cover $D'$ containing an opening $n$, a grating E in the tank D below said cover, a shell $F'$ rising from said cover and forming with the tank A an expansion $B^2$ of said chamber, a shell $H'$ rising from said cover inside the shell $F'$ and forming the chamber H with a portion of said bottom for its base projecting as a shelf I over said grating, and a gas-holder F fitting within the shell $F'$ and provided with a cover $F^2$ having an outlet G, substantially as and for the purpose set forth.

HENRY F. FULLER.

In presence of—
  J. H. LEE,
  B. T. SPENCER.